(12) United States Patent
Llamas Sandin (10) Patent No.: US 8,186,617 B2
(45) Date of Patent: May 29, 2012

(54) AIRCRAFT HAVING A LAMBDA-BOX WING CONFIGURATION

(75) Inventor: Raul Carlos Llamas Sandin, Madrid (ES)

(73) Assignee: Airbus Operations S.L., Getafe (ES)

( * ) Notice: Subject to any disclaimer, the term of this patent is extended or adjusted under 35 U.S.C. 154(b) by 559 days.

(21) Appl. No.: 12/481,854

(22) Filed: Jun. 10, 2009

(65) Prior Publication Data

US 2011/0180660 A1    Jul. 28, 2011

(30) Foreign Application Priority Data

Apr. 7, 2009   (ES) .................................. 200900951

(51) Int. Cl.
    *B64C 39/08*       (2006.01)

(52) U.S. Cl. .................. 244/45 R; 244/45 A; 244/34 R; 244/55; 244/4 R (58) Field of Classification Search ................ 244/45 R, 244/55, 46–49, 45 A, 56, 34 R, 4 R
See application file for complete search history.

(56) References Cited

U.S. PATENT DOCUMENTS

| | | | | |
|---|---|---|---|---|
| 4,053,125 A | * | 10/1977 | Ratony | 244/46 |
| 4,365,773 A | * | 12/1982 | Wolkovitch | 244/45 R |
| 5,899,409 A | * | 5/1999 | Frediani | 244/13 |
| 6,340,134 B1 | * | 1/2002 | Meschino | 244/45 R |
| 2006/0144991 A1 | * | 7/2006 | Frediani | 244/45 R |

* cited by examiner

*Primary Examiner* — Timothy D Collins
*Assistant Examiner* — Jamie S Stehle
(74) *Attorney, Agent, or Firm* — Oblon, Spivak, McClelland, Maier & Neustadt, L.L.P.

(57) ABSTRACT

An aircraft having a lambda-box wing configuration includes, a fuselage, a propulsion system, a first pair of swept-back airfoils, connected to the top forward portion of the fuselage, a second pair of swept-forward airfoils, connected to the lower rear portion of the fuselage at a point of the said fuselage aft of the connection of the swept-back airfoils, and a third pair of substantially vertical airfoils, the tips of the swept-forward airfoils being connected to the lower side of the swept-back airfoils at an intermediate point of the span of the said swept-back airfoils, by the substantially vertical airfoils, the swept-back airfoils having a higher aspect ratio than that of the swept-forward airfoils, which makes the swept-back airfoils have a reduced induced drag without penalizing their weight.

14 Claims, 5 Drawing Sheets

AIRCRAFT HAVING A LAMBDA-BOX WING CONFIGURATION

FIELD OF THE INVENTION

The present invention relates to an aircraft having a wing arrangement defining a box or closed frame which reduces the lift-induced drag and which provides an improved structural efficiency of the aircraft as well as a reduction of the perceived engine noise in the ground.

BACKGROUND

Economic efficiency is an important consideration in the art of aircraft design. In recent times the environmental impact of the aircraft has also become an important factor included in the design process. In general it can be asserted that both economic and environmental efficiency are improved when the aircraft has a low fuel consumption. The main contributing factors to reduce the fuel consumption of an aircraft are: lower aerodynamic drag, lower structural weight and higher propulsive efficiency.

The aerodynamic drag of an aircraft can be interpreted as the energy per unit length that the aircraft transfers to the air in which it moves and is, in fact, the force opposing the movement of the aircraft which the thrust provided by the propulsive system must equate in steady and level flight.

Various physical phenomena contribute to the generation of aerodynamic drag giving rise to various forms of drag analysed in the aircraft design process, principally;

Friction drag, produced by the transfer of kinetic energy to the boundary layer or air that surrounds the skin of the aircraft and that becomes the wake of turbulent air that the vehicle leaves behind. Friction drag increases with the square of the velocity and is proportional to the wetted area, which is the surface area of the aircraft skin exposed to the external airflow. In order to reduce friction drag it is desirable to reduce the wetted area of the aircraft.

Induced drag or lift-induced drag is a drag force that occurs whenever a moving object of finite size redirects the airflow coming at it. This drag force typically occurs in aircraft due to wings redirecting the incoming air downwards to produce lift. With other parameters remaining the same, as the aircraft angle of attack increases, induced drag is also increased.

The aircraft lift force is produced by accelerating the airflow over the upper surface of a wing, thereby creating a pressure difference between the air flowing over the wing upper and lower surfaces. On a wing of finite span, some air flows around the wingtip from the lower surface to the upper surface producing wingtip vortices which trail behind the aircraft wings. The kinetic energy absorbed by the wingtip vortices is ultimately extracted from the propulsive system of the aircraft and therefore is a form of drag. These wingtip vortices also modify the airflow around a wing, compared to a wing of infinite span, reducing the effectiveness of the wing to generate lift, thus requiring a higher angle of attack to compensate, and tilting the total aerodynamic force rearwards. Induced drag on airfoils is inversely proportional to the square of the airspeed, i.e., if the speed of the aircraft increases, the induced drag is reduced on airfoils as the total mass of air deflected by the wing per unit time is increased.

Induced drag depends, on one side, on the wing planform and, on the other side, on the aircraft speed. A high aspect ratio wing, i.e., a wing which is long and slender produces less induced drag. However, in these long and slender wings the lifting forces create large cantilevered loads and therefore large bending moments, especially at the wing roots, which lead to increased structural wing and aircraft weight.

The increased weight of slender wings led in the early days of aviation to aircraft comprising multiple airfoils braced by struts and cables, being a biplane design usual. As new materials became available, aircraft design developed into the monoplane configuration, with wing aspect ratios in the order of 10, as a compromise between low induced drag and acceptable structural weight.

Wave or Compressible drag. Modern high-speed aircraft cruise at speeds close to the speed of sound, at around Mach 0.8, i.e., eight tenths of the speed of sound. At these high speeds the airflow is accelerated by the shape of the airfoil which may lead to local flow velocities very close or above the speed of sound, which in turn produces a loss of kinetic energy due to irreversible effects in the compression and expansion of the air. This is another form of aerodynamic drag, particular of the flight at speeds close or above the speed of sound, known as wave or compressible drag due to compressible effects. It has been well known since the mid $20^{th}$ century that the wave drag can be significantly decreased by designing the wings with sweepback so that the local airflow goes around an airfoil of an apparent thickness reduced by the cosine of the sweepback angle, whereas structurally the wing behaves as having its real thickness.

As the aircraft must provide enough aerodynamic lift to sustain its weight in steady flight, it is clear that, for a given aircraft configuration and payload, heavier aircrafts will have more drag and thus more fuel consumption, being structural efficiency or lightness a desirable design feature in order to improve the economic efficiency of aircraft.

One measure of the overall propulsive efficiency of the powerplant of the aircraft is the mass of fuel required to provide a given thrust force per unit of time. For the thermal engines used in aeronautics, e.g., turbojets, turbofans, propfans, turboprops, piston engines etc. . . . , the overall propulsive efficiency depends on the design of the internal machinery and operating temperatures of the engine thermodynamic cycle but also inversely on the ratio of the velocity of the exhaust gases to the velocity of the aircraft. Therefore, in order to increase the propulsive efficiency of an aircraft engine it is desirable to increase the diameter of the elements that impart linear momentum to the air, e.g., propeller, fan, unducted-fan, so that for a given thrust force, i.e. momentum transfer per unit time, the mass flow is increased and the exhaust velocity is lowered. This has lead to a continuous increase in the diameter of aircraft engines during the past decades, to a point where it is becoming difficult to position the engines in the classical location under the wings.

An additional consideration regarding the environmental efficiency of an aircraft is the noise signature that it produces along its flight path, particularly in the take-off and landing phases, where the aircraft is closest to the ground. Increasing the diameter of the propulsive elements also helps to reduce the noise emitted by the engine. Additional perceived noise reductions can be obtained if the noise radiated by the engines can be shielded by the structure of the aircraft.

A typical modern large high speed transport aircraft tends to be of the monoplane configuration, with a single wing or airfoil of an aspect ratio around 10 and wing sweepback angles of around 30 to 40 degrees, with engines of large diameter hanging from under the wings or attached to the rear portion of the fuselage. This configuration has evolved during the last several decades and has become highly optimised.

However, based on our previous discussion, it is evident that further improvements in terms of fuel consumption could be possible if the wing aspect ratio could be increased without an excessive weight penalty, or if the total wetted area of the aircraft could be reduced, for example removing stabilising elements in the empennage which do not contribute directly to the generation of lift. The overall propulsive efficiency could also be increased if the aircraft configuration could accommodate engines of larger diameter.

Likewise, a design improvement could be associated to a reduction of the perceived noise on the ground, either obtained by engines of larger diameter or by an aircraft configuration which helps to shield the engine noise from the ground.

Various inventors have contributed to the development of aircraft concepts that aspire to accomplish some of the aircraft design improvements listed above.

For example, document WO 2004/074093 discloses a swept-wing box-type aircraft comprising negative sweep wings connected to the fuselage rear upper portion, the positive sweep angle wings being connected to the fuselage forward lower portion, such that this wing configuration defines an aerodynamic channel intended to provide aircraft static flight stability. The merit of this configuration is that both wings contribute to the generation of lift, thereby removing the horizontal stabilising surfaces of the classical configuration, the said surfaces, although providing stability, contribute to increase the friction drag. Moreover, as the wings are joined at the tips, the tip vortices of each wing tend to cancel each other, which reduces the induced drag of the lifting system of airfoils. From the structural point of view, joining the wings at the tip provides mutual torsional support between the wings, which should tend to reduce the weight. However, this aircraft configuration, where the rear wing is higher than the forward wing, is prone to the well known problem of deep stall, in which the separated airflow from the fore wing at high angles of attack can blank the aft wing, leading to a stable and difficult to recover aircraft pitch-up attitude and loss of lift. Additionally, the engines are located in the fuselage, so that in cases where the aircraft is subjected to high accelerations, the inertial loads introduced by the engines will have to be transmitted by the fuselage to the wings, leading to increased weight. Moreover, the landing gear is also located in the lower portion of the fuselage, between the wings, so that in cases of landing with high vertical accelerations, the fuselage will have to resist the bending moments introduced by the wings and the local loads at the landing gear support structure, which will also require a heavy structure. It must also be noted that, in this configuration, no engine noise shielding is achieved, as there is a direct noise path between the engines and the ground.

Document U.S. Pat. No. 4,365,773 discloses an aircraft having a fuselage and a pair of first wings extending outwardly from the vertical tail, and a pair of second wings extending outwardly from the forward portion of the fuselage, at a lower elevation than the first pair of wings, the pair of wings presenting a double triangle shape or diamond shape along with the aircraft fuselage. A particular merit of this configuration is that the joined wings form a diamond shape in front view, so that they mutually support in bending as well as in torsion, which can result in a lighter wing structure, although a substantially heavier fin and rear fuselage than in a classical configuration can be expected. However, this aircraft configuration, where the rear wing is higher than the forward wing, is also prone to the well known problem of deep stall.

Document U.S. Pat. No. 4,053,125 provides a similar configuration of the joined-wing type as it has been disclosed.

Document U.S. Pat. No. 6,340,134, upon which the preamble of claim 1 is based, discloses an aircraft wing configuration having a high aspect ratio wing generating reduced induced drag. The document discloses a configuration comprising a main wing and a high aspect ratio supplementary wing, these main and supplementary wings being connected by at least two struts. This configuration comprises also a horizontal stabilizer and elevators, necessary to control the aircraft in pitch. The aircraft of U.S. Pat. No. 6,340,134 really functions as a biplane aircraft of the sesquiplane type, where the lower wing is substantially smaller than the top wing and acts mainly as a support for the struts. Although a significant reduction of the induced drag can be expected from this configuration, the friction drag produced by the horizontal stabilizer remains as in the conventional configuration. The use of a structurally efficient lower wing to provide support to the top wing is an enabling factor to have at least a wing of very high aspect ratio without incurring a serious weight penalty. In terms of perceived engine noise, this configuration is also equivalent to the classical aircraft configuration, as the engines are located under the wings, therefore being provided a direct noise path between said engines and the ground. Additionally, the fact that the two wings are substantially parallel may lead to an increased compressible drag in the flight at high speeds due to the aerodynamic interaction of the wings, which forms a flow channel between them.

The present invention is intended to solve above-mentioned disadvantages.

SUMMARY OF THE INVENTION

According to the invention, it is disclosed an aircraft comprising a fuselage 1, a propulsion system 5, a first pair of swept-back airfoils 2, connected to the top forward portion of the fuselage 1, a second pair of swept-forward airfoils 3, connected to the lower rear portion of the fuselage 1 at a point of the said fuselage 1 aft of the connection of the swept-back airfoils 2, and a third pair of substantially vertical airfoils 4, the tips of the swept-forward airfoils 3 being connected to the lower side of the swept-back airfoils 2 at an intermediate point of the span of the said swept-back airfoils 2, by means of the substantially vertical airfoils 4, the swept-back airfoils 2 having a higher aspect ratio than that of the swept-forward airfoils 3, which makes the swept-back airfoils 2 have a reduced induced drag without penalizing their weight, as their maximum bending moment is reduced because of the structural support that the swept-forward airfoils 3 provide to the swept-back airfoils 2 through the vertical airfoils 4.

According to the invention, the swept-back airfoils 2 and the swept-forward airfoils 3 have sweep angles such that provide a horizontal separation between said swept-back airfoils 2 and swept-forward airfoils 3, this separation reducing the compressible drag in the aircraft flight at high speeds due to the aerodynamic interaction of the airfoils 2 and 3, which is also advantageous for stability and control in flight.

Also, the horizontal stagger of the swept-back airfoils 2 and swept-forward airfoils 3 of the aircraft configuration according to the invention provides sufficient longitudinal stability and control to the aircraft without the need of a horizontal stabilizer, resulting in a reduction of the overall wetted area and, therefore, in a lower friction drag.

Moreover, according to the lambda-box wing configuration aircraft of the invention, the center of lift of the swept-back airfoils 2 is located forward of the center of gravity of the aircraft, the center of lift of the swept-forward airfoils 3 being located behind the center of gravity of the aircraft, this configuration helping to provide static stability to the mentioned aircraft.

Besides, the aircraft having the wing configuration of the lambda-box type of the invention comprises the propulsion system 5 located on the upper side of the swept-forward airfoils 3, in such a way that the noise radiated downwards by the exhaust gases of the propulsion system 5 intercepts the said swept-forward airfoils 3, which act as noise shields reducing the perceived noise the ground during the aircraft flight.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION OF THE INVENTION

According to a first aspect, the invention relates to an aircraft comprising: a fuselage 1; a first pair of swept-back airfoils 2, connected to the top forward portion of the fuselage 1; a second pair of swept-forward airfoils 3, connected to the lower rear portion of the fuselage 1; a third pair of substantially vertical airfoils 4, connecting the outermost tip of the swept-forward airfoils 3 to an intermediate point of the span of the swept-back pair of airfoils 2; a propulsion system 5 connected to the pair of swept-forward airfoils 3; a landing gear system 6; at least one substantially vertical airfoil 7 connected to the aft portion of the fuselage 1, which provides directional stability and control to the aircraft.

The tips of the swept-forward airfoils 3 are connected to the lower side of the swept-back airfoils 2 at an intermediate point of the span of the said swept-back airfoils 2, by means of substantially vertical airfoils 4, acting as an structural joint of the swept-back airfoils 2 and the swept-forward airfoils 3, designed for transmitting loads/forces between the swept-back airfoils 2 and the swept-forward airfoils 3, said airfoils 4 being designed to act as aerodynamic fences or winglets to the swept-forward airfoils 3 with the aim of reducing the strength of the aerodynamic vortices that are normally produced at the tip of airfoils, so that the induced aerodynamic drag of the said swept-forward airfoils 3 is reduced.

The swept-forward airfoils 3 provide aerodynamic forces in the upwards direction during the cruise portion of the flight of the aircraft.

Figure 2:
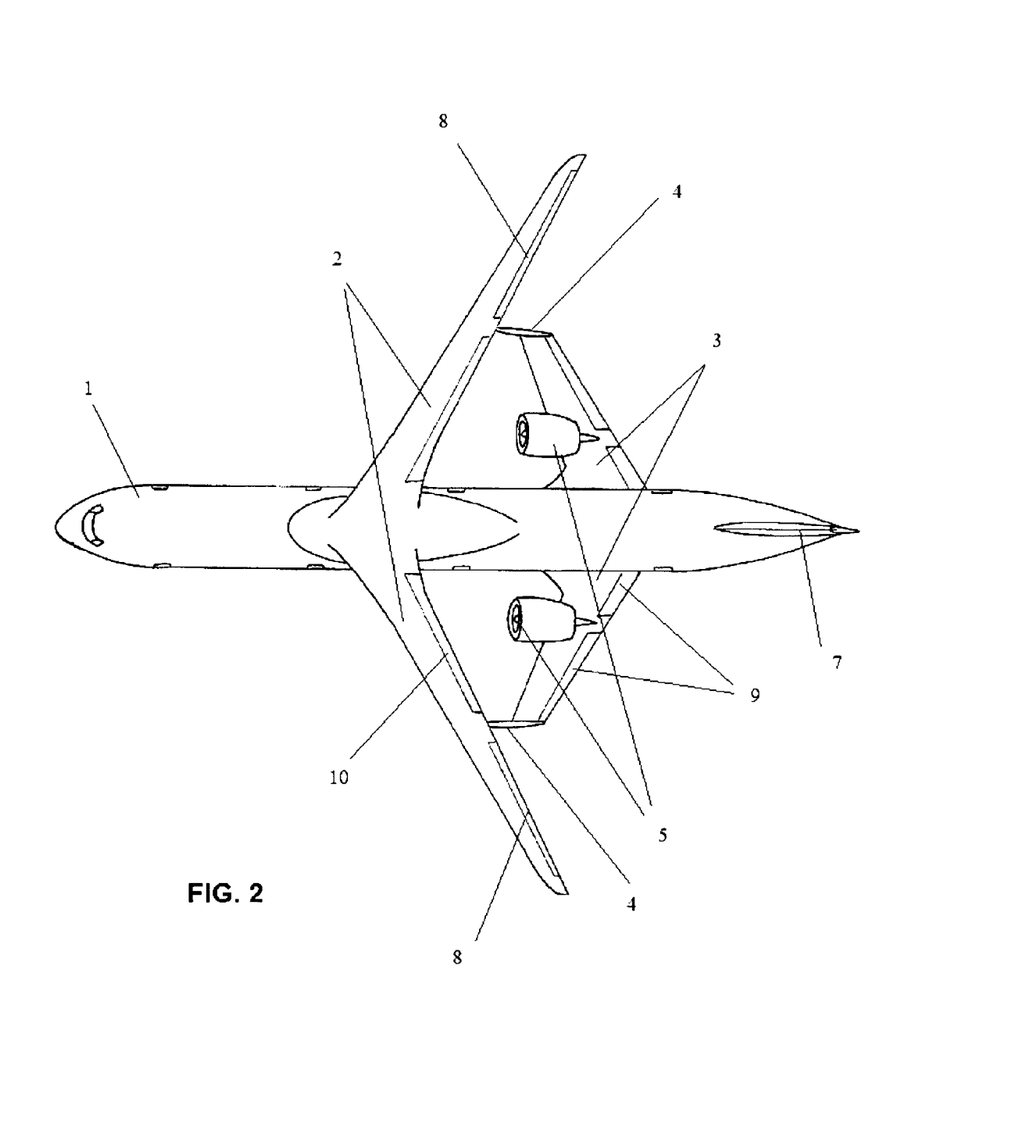
FIG. 2 shows a top view of an aircraft having a wing arrangement defining a box or closed frame according to a preferred embodiment of the invention.

According to the invention, and as it can more clearly be seen in FIG. 2, the swept-back airfoils 2 have a significantly higher aspect ratio, defined to be the square of the span divided by the wing area (the aspect ratio representing how long and slender the wings are) than that of the swept-forward airfoils 3. This makes the swept-back airfoils 2 very efficient aerodynamically as their induced drag is much lower than that of a classical airfoil having an aspect ratio in the order of ten, without penalizing their weight as their maximum bending moment is reduced very significantly owing to the structural support that the swept-forward airfoils 3 provide to the slender swept-back airfoils 2 through the vertical airfoils 4. The swept-forward airfoils 3 are designed to be structurally efficient in order to provide bending support to the swept-back airfoils 2 and also to withstand the loads introduced by the propulsion system 5 and by the main part of the landing gear system 6 located in the lower side of said swept-forward airfoils 3. The structural efficiency of the swept-forward airfoils 3 is achieved by having relatively thick airfoils, so that the internal loads in the load bearing skins are reduced, which leads to long chords or airfoil lengths and, therefore, to a reduced aspect ratio. The reduced aspect ratio of the swept-forward airfoils 3 would normally lead to high induced aerodynamic drag if the tips of the airfoils were free, but in the present invention, the vertical airfoils 4 act as an aerodynamic fence, separating the upper and lower surfaces of the swept-forward airfoils 3 and thus reducing the strength of the tip vortex and the associated induced drag.

The high aspect ratio of the swept-back airfoils 2 and the use of the airfoils 4 as aerodynamic fences for the swept-forward airfoils 3 result in a reduced overall induced drag of the aircraft having the wing configuration of the present invention. Additionally, the fact that in a preferred embodiment of the present invention there are no additional horizontal stabilizing surfaces as the horizontal stagger of the pairs of airfoils 2 and 3 provides sufficient longitudinal stability and control, results in a reduction of the overall wetted area in comparison with the classical configuration and, therefore, in a lower friction drag. The sweep angles of the pairs of airfoils 2 and 3, as well as providing the separation between airfoils required for stability and control are also beneficial for the flight at high speed, close to the speed of sound. Therefore, it can be said that the aircraft having the wing configuration of the present invention, called lambda-box configuration because of the planform of the said wing configuration, similar to that of a lambda symbol, achieves an overall reduction of aerodynamic drag.

In the present invention, if the aircraft, flying in a trimmed and steady condition, is subjected to a pitch-up perturbation in angle of attack as may be caused by encountering a gust in flight, the increase in lift in the swept-forward airfoils 3 will be greater than in the swept-back airfoils 2 so that the resulting pitching moment will tend to lower the nose of the aircraft, this being the main condition for static stability. The above argument requires than the center of lift of the swept-back airfoils 2 is located forward of the center of gravity of the aircraft and that the center of lift of the swept-forward airfoils 3 is located behind the center of gravity of the aircraft and this is achieved in the present invention by the geometric arrangement of the airfoils in terms of their sweep angles and the location of their attachments to the fuselage 1. It can be seen then, that with both pairs of airfoils 2, 3 providing positive lift and arranged in such a manner as to provide natural static stability, there is no need to have an additional horizontal stabilizer.

The pitch control and trim of the aircraft is obtained by the deflection in the adequate direction of control surfaces 10 on the swept-back airfoils 2 located at the inboard portion of said swept-back airfoils 2 and adjacent to the fuselage 1, these control surfaces 10 being able to deflect downwards in order to produce a pitch-up moment during the take-off run to assist the aircraft rotation for lift-off, and of control surfaces 9 located at the inboard portion of the swept-forward airfoils 3 adjacent to the fuselage 1, these control surfaces 9 being able to deflect upwards in order to produce a pitch-up moment during the take-off run to assist the aircraft rotation for lift-off. Thus, in order to produce the rotation of the aircraft during the take-off run, the control surfaces 10 have to deflect downwards and the control surfaces 9 have to deflect upwards. From the above discussion, it is clear that in a preferred embodiment of the present invention there is no need of having an additional horizontal stabilizer that does not contribute to the lift but that is required in the classical configuration to provide stability. Therefore, the overall wetted area of the aircraft having the lambda-box wing configuration of the present invention can be reduced, with an associated reduction of the friction drag and thus an improvement of the fuel efficiency.

Figure 6:
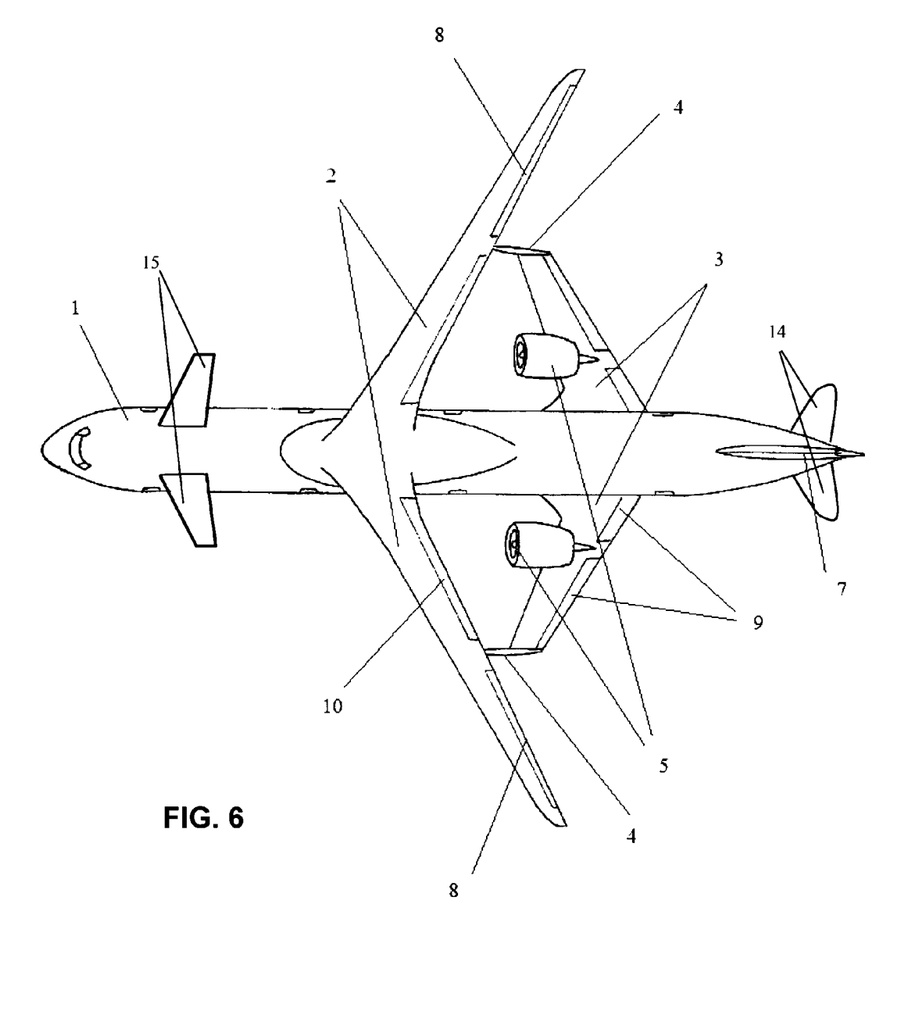
FIG. 6 shows a top view of an aircraft having a wing arrangement defining a box or closed frame according to another embodiment of the invention that comprises additional horizontal stabilizing surfaces connected to the fuselage of the said aircraft.

In another embodiment of the present invention, the aircraft can additionally comprise a substantially horizontal pair of airfoils 14 located in the aft portion of the fuselage 1, these airfoils 14 being able to deflect around an axis perpendicular to the plane of symmetry of the aircraft to provide pitch control to the said aircraft, this configuration being suitable for the case in which, with the preferred embodiment of the invention, additional stability or control is required.

In yet another embodiment of the present invention, the aircraft can additionally comprise a substantially horizontal pair of airfoils 15 located in the forward portion of the fuselage 1, these airfoils 15 being able to deflect around an axis perpendicular to the plane of symmetry of the aircraft to provide pitch control to the said aircraft, this configuration being suitable for the case in which, with the preferred embodiment of the invention, additional stability or control is required.

The roll or lateral control of the aircraft at low speeds is provided by trailing edge control surfaces 8 being installed on the outer portion of the swept-back airfoils 2.

Figure 5:
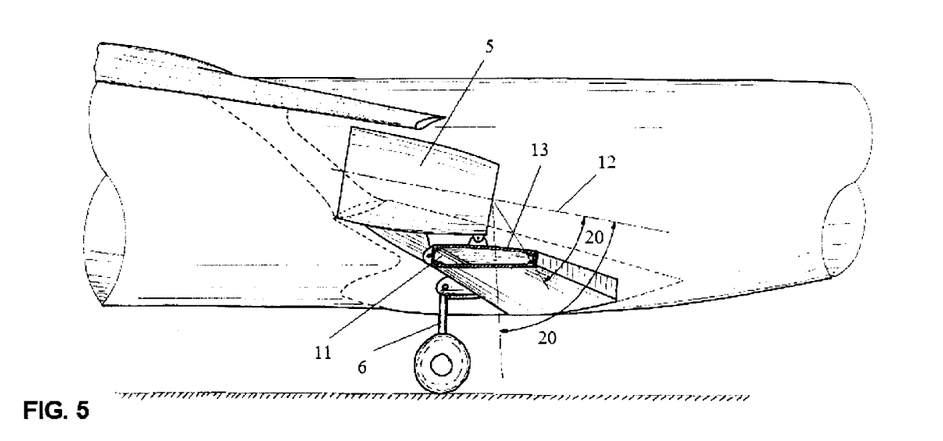
FIG. 5 represents a partial side view of an aircraft according to the preferred embodiment of the invention showing one of the engines of the propulsion system, the main landing gear and the internal structure of the swept-forward wing.

The propulsion system 5 of the aircraft typically comprises at least two engines 5 of the turbojet, turbofan, turboprop or unducted fan type, said engines 5 being structurally connected to the upper side of the swept-forward airfoils 3, and being located in such a manner that the said swept-forward airfoils 3 act as noise shields to reduce the perceived noise produced by the exhaust gases of said engines 5 on the ground during the aircraft flight. This perceived noise reduction or noise shielding is achieved when the downwards portion of the noise radiation of the exhaust gases generated by the engines 5 emitted at an angle 20 between 30 and 75 degrees, this angle 20 being measured from the axis of symmetry of the exhaust jet, is intercepted by the upper side of the swept-forward airfoils 3, which act as noise shields in this case.

The substantially vertical airfoil 7, located at the rear of the fuselage 1, acts as a fin in order to provide directional stability and control to the aircraft.

Figure 1:
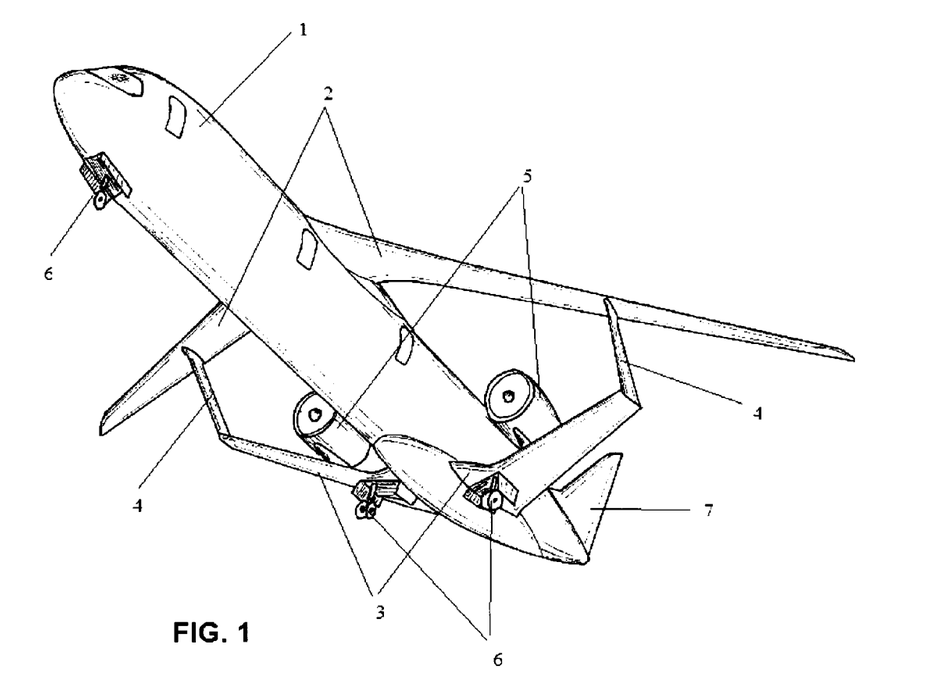
FIG. 1 shows a perspective view of an aircraft having a wing arrangement defining a box or closed frame according to a preferred embodiment of the invention.

The landing gear system 6 comprises at least one leg connected to the lower portion of the forward fuselage 1, and two legs connected to the lower side of the swept-forward airfoils 3 (FIG. 1). The at least two legs of the lower side of the swept-forward airfoils 3 of the landing gear system 6 and the engines 5 are connected to the same structural spar 11 of the swept-forward airfoils 3, so that the inertial loads introduced by the engines 5 in cases of landing with high vertical accelerations are transmitted to the at least two legs of the landing gear system 6 and thereof to the ground through the shortest possible load path within the airframe as it is allowed by landing gear legs separation and engine installation requirements.

Figure 3:
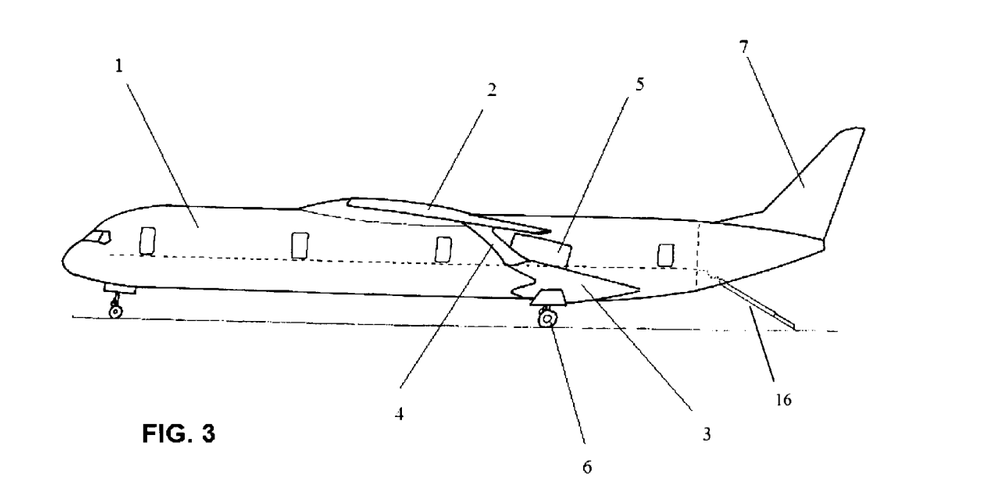
FIG. 3 shows a side view of an aircraft having a wing arrangement defining a box or closed frame according to a preferred embodiment of the invention.
Figure 4:
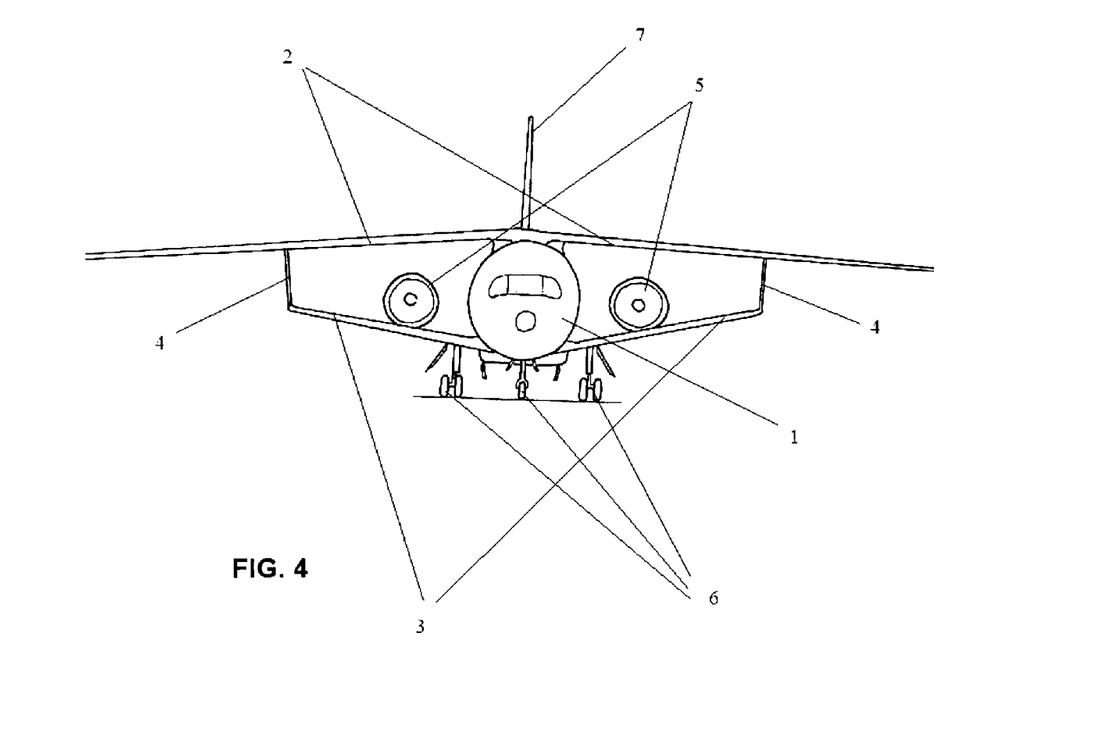
FIG. 4 shows a front view of an aircraft having a wing arrangement defining a box or closed frame according to a preferred embodiment of the invention.

Owing to the location of the propulsive system 5 over the swept-forward airfoils 3, low ground clearance, or distance from the lower side of the fuselage 1 to the ground, can be achieved, allowing therefore the installation of engines of large diameter without requiring long and heavy legs of the landing gear system 6. This low ground clearance and the lack of horizontal stabilizing surfaces at the rear of the fuselage 1 make the aircraft lambda-box wing configuration of the present invention particularly suited to the installation of a retractable staircase 16 at the rear lower portion of the fuselage 1 (FIG. 3) to allow direct access of the passengers to the interior of the aircraft without the need for additional ground equipment.

Although the present invention has been fully described in connection with preferred embodiments, it is evident that modifications may be introduced within the scope thereof, not considering this as limited by these embodiments, but by the contents of the following claims.

The invention claimed is:

1. An aircraft comprising:
   a fuselage,
   a propulsion system,
   a pair of swept-back airfoils, connected to a top forward portion of the fuselage,
   a pair of swept-forward airfoils connected to a lower rear portion of the fuselage at a point of the fuselage aft of a connection of the swept-back airfoils,
   a pair of substantially vertical airfoils,
   wherein the tips of the swept-forward airfoils are connected to a lower side of the swept-back airfoils at an intermediate point of a span of the swept-back airfoils by the substantially vertical airfoils, the swept-back airfoils having a higher aspect ratio than that of the swept-forward airfoils, which makes the swept-back airfoils have a reduced induced drag without penalizing their weight, as their maximum bending moment is reduced because of structural support that the swept-forward airfoils provide to the swept-back airfoils through the vertical airfoils, and
   a landing gear system comprising at least one leg connected to a lower portion of the forward fuselage, and two legs connected to a lower side of the swept-forward airfoils, the at least two legs of the lower side of the swept-forward airfoils and the propulsion system being connected to a same structural spar of the swept-forward airfoils, so that the inertial loads introduced by the propulsion system in cases of landing with high vertical accelerations are transmitted to the landing gear legs through a shortest possible load path within an airframe as allowed by landing gear legs separation and engine installation requirements.

2. The aircraft according to claim 1, wherein the swept-back airfoils and the swept-forward airfoils have sweep angles providing a horizontal separation between said swept-back airfoils and swept-forward airfoils, this separation reducing compressible drag of the aircraft flight at high speeds due to aerodynamic interaction of the swept-back airfoils and swept-forward airfoils.

3. The aircraft according to claim 1 or 2, wherein horizontal stagger of the swept-back airfoils and swept-forward airfoils provides sufficient longitudinal stability and control to the aircraft without the need of a horizontal stabilizer.

4. The aircraft according to claim 1, wherein a center of lift of the swept-back airfoils is located forward of a center of gravity of the aircraft, the center of lift of the swept-forward airfoils being located behind the center of gravity of the aircraft, this configuration helping to provide static stability to the aircraft.

5. The aircraft according to claim 1, wherein the propulsion system is located on an upper side of the swept-forward airfoils such that noise radiated downwards by exhaust gases of the propulsion system intercepts the swept-forward airfoils, which act as noise shields reducing perceived noise between the engines and the ground during aircraft flight.

6. The aircraft according to claim 5, wherein the noise radiated by the exhaust gases of the propulsion system and emitted downwards at an angle between 30° and 70°, this angle being measured from an axis of symmetry of an exhaust jet, intersects the upper side of the swept-forward airfoils which thereby act as noise shields.

7. The aircraft according to claim 1, wherein the propulsion system comprises at least two engines of turbojet, turbofan, turboprop or unducted fan type.

8. The aircraft according to claim 1, wherein the swept-back airfoils comprise control surfaces located at an inboard portion of said swept-back airfoils and adjacent to the fuselage such that these control surfaces are able to deflect downwards in order to produce a pitch-up moment during a take-off run to assist aircraft rotation for lift-off.

9. The aircraft according to claim 1, wherein the swept-forward airfoils comprise control surfaces located at an inboard portion of the swept-forward airfoils adjacent to the fuselage, these control surfaces being able to deflect upwards in order to produce a pitch-up moment during a take-off run to assist aircraft rotation for lift-off.

10. The aircraft according to claim 1, wherein the swept-forward airfoils provide aerodynamic forces in an upwards direction during a cruise portion of flight of the aircraft.

11. The aircraft according to claim 1, wherein the swept-back airfoils comprise trailing edge control surfaces that provide roll control to the aircraft.

12. The aircraft according to claim 1, further comprising:
a retractable passenger staircase located at a rear lower portion of the fuselage to allow access to an interior of the aircraft without aid of ground equipment.

13. The aircraft according to claim 1, further comprising:
a pair of airfoils connected to a rear portion of the fuselage, the airfoils providing additional static longitudinal stability and also longitudinal control to the aircraft by being able to rotate around an axis perpendicular to a plane of symmetry of the aircraft.

14. The aircraft according to claim 1, further comprising:
a pair of airfoils connected to a forward portion of the fuselage, the airfoils providing additional static longitudinal stability and also longitudinal control to the aircraft by being able to rotate around an axis perpendicular to a plane of symmetry of the aircraft.

\* \* \* \* \*